(No Model.)
D. COLE.
CAR COUPLING.
No. 470,180. Patented Mar. 8, 1892.
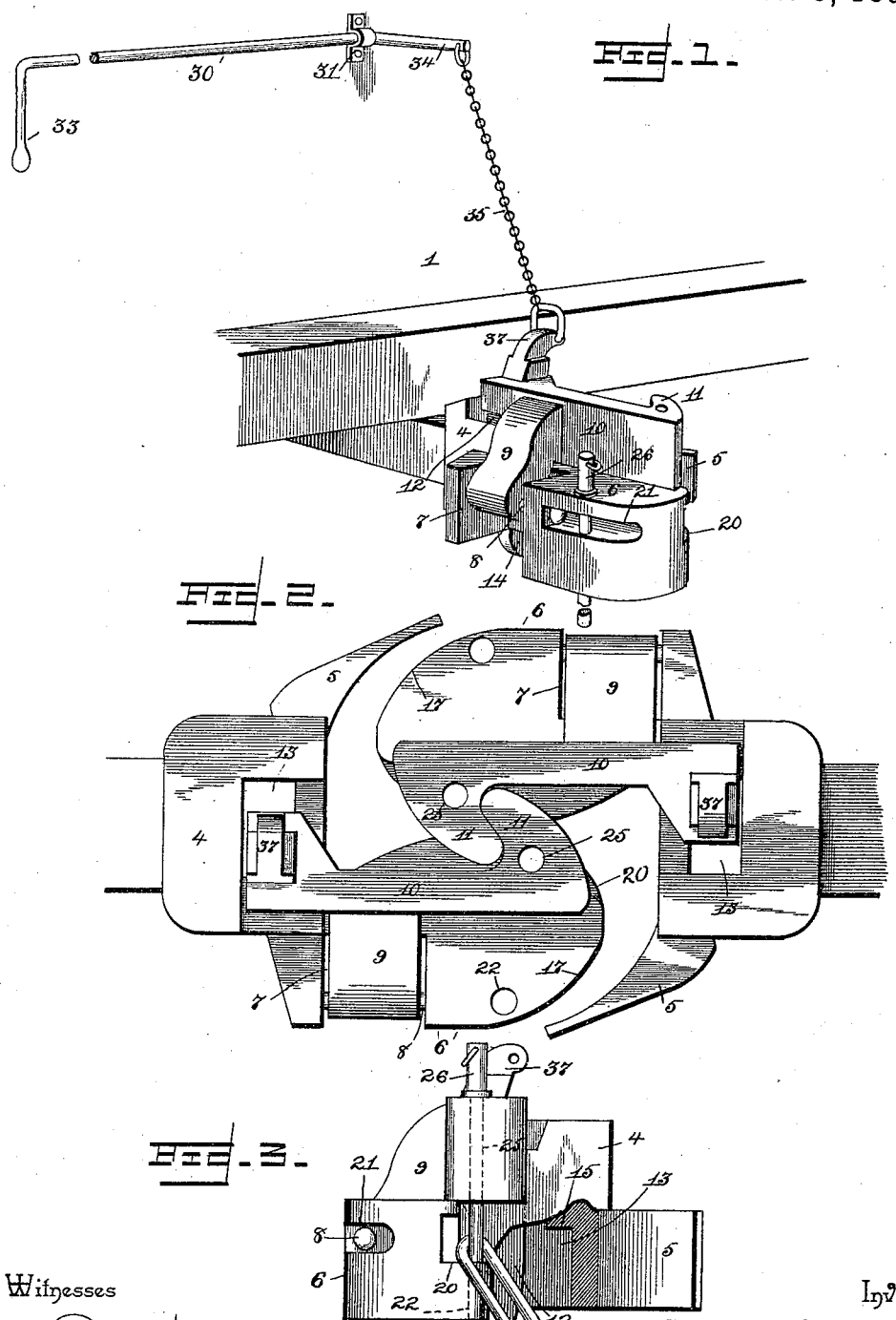
Witnesses
E. S. Duvall Jr.
N. T. Collamer
Inventor
Dexter Cole.
By his Attorneys,
C. A. Snow & Co.

UNITED STATES PATENT OFFICE.

DEXTER COLE, OF PAYNE'S CORNERS, ASSIGNOR OF ONE-HALF TO FRED. G. STEWART, OF PENZA, AND CHARLIE R. DENNISON, OF COALBURG, OHIO.

CAR-COUPLING.

SPECIFICATION forming part of Letters Patent No. 470,180, dated March 8, 1892.

Application filed October 1, 1891. Serial No. 407,401. (No model.)

*To all whom it may concern:*

Be it known that I, DEXTER COLE, a citizen of the United States, residing at Payne's Corners, in the county of Trumbull and State of Ohio, have invented a new and useful Car-Coupling, of which the following is a specification.

This invention relates to car-couplings of the twin-jaw pattern, and the object thereof is to produce certain improvements in devices of this character.

To this end the invention consists in the construction hereinafter more fully described and claimed, and as illustrated on the sheet of drawings, wherein—

Figure 1 is a perspective view of the end of a car with my improved coupling attached. Fig. 2 is a plan view of two draw-heads coupled. Fig. 3 is a front elevation of one draw-head, partly broken away.

Referring to the said drawings, the numeral 1 designates the car-body, beneath which is supported in any suitable manner the draw-bar, and to the front end of the latter is secured the draw-head. This comprises a body 4, having a wing 5 projecting forward and outward from its left side and an arm 6 projecting forward from its right side. The outer side of said arm has a recess 7, in which, on a horizontal pivot 8, is mounted an ear 9 at the back of a catch 10. This catch has a hook 11 at its front end, curving inward and adapted to rest normally on the top of the arm 6, and has at its rear end a tail 12, passing down through a hole 13, Fig. 3, in the body 4, and having a hooked lower end 14, striking a shoulder 15 in said hole when the catch is raised around its pivot. When the companion draw-head approaches, the two hooks rock outward around their pivots and the wings 5 strike the two arms, whose front ends are rounded, as at 17, and guide the draw-heads properly together. The catches then fall back into place and the cars are coupled, after which they may be drawn around curves and up and down grades with perfect safety.

On the inner face of the arm 6 is a horizontal notch 20 and on its outer face a similar notch 21, and each has a vertical pin-opening 22, that in the inner notch passes at its upper end through the hook 11, as at 25. 26 is a coupling-pin, which may be dropped into either of these holes when it is desired to couple this draw-head to one of the ordinary construction, and when great safety is desired the pin may be seated in the inner hole to prevent the hook rising accidentally and uncoupling the cars. When either hook is so raised for this purpose, the hooked lower end 14 of the tail 12 strikes the shoulder 15 and prevents the catch passing its center of gravity.

Although any preferred form of catch-operating devices may be used, I generally employ that shown. It consists of a rod 30, oscillating in bearings 31 in the end of the car, having a handle 33 at its outer end and provided with a forwardly-turned inner end 34. To the latter is connected a chain 35, which leads down and connects with a hook 37 on the top of the catch. The ear 9 is mounted on the pivot 8, and is preferably formed integral with the catch 10, and when the hook 37 is lifted upward the catch will be swung laterally on the pivot. By this construction when the rod is turned by its handle tension is imparted to the chain and the catch is turned around its pivot and disengaged from the catch on the opposite car.

This coupling can be cheaply manufactured and easily applied to cars now in use. I do not limit myself to the precise details of construction, as considerable change may be made therein without departing from the spirit of the invention, and the size, proportion, and materials of parts are matters with which the builder will deal rather than the inventor.

I claim as the salient features of this invention—

1. A draw-head comprising a body having a vertical hole with a shoulder therein, a forwardly-projecting arm at one side having a vertical recess at its back, and a forwardly and outwardly projecting wing at the other side, in combination with a catch having a hooked front end and standing above said arm, an ear at the back of said catch passing into said recess and mounted on a horizontal pivot therein, and a tail at the rear end of the catch, passing down through said hole and having a hooked lower end, as and for the purpose set forth.

2. A draw-head comprising a body, a forwardly-projecting arm at one side having a vertical recess at its back, and a forwardly and outwardly projecting wing at the other side, in combination with a catch having a hooked front end and standing above said arm, and an ear at the back of said catch passing into said recess and mounted on a horizontal pivot therein, as and for the purpose set forth.

3. A draw-head comprising a body, a forwardly-projecting arm at one side having a vertical recess at its back, and a forwardly and outwardly projecting wing at the other side, in combination with a catch having a hooked front end and standing above said arm, an ear at the back of said catch passing into said recess and mounted on a horizontal pivot therein, the front end of said arm having horizontal recesses outside and inside, with intersecting vertical pin-openings, the upper end of the opening on the inside passing through the hook of said catch, and a coupling-pin adapted to be seated in either of said openings, substantially as described, 4. A draw-head comprising a body having a vertical hole with a shoulder therein, a forwardly-projecting arm at one side having a vertical recess at its back, and a forwardly and outwardly projecting wing at the other side, in combination with a catch having a hooked front end and standing above said arm, an ear at the back of said catch passing into said recess and mounted on a horizontal pivot therein, a hook on the top of the catch, lifting devices connected with said hook and leading to the side of the car, and a tail at the rear end of the catch passing down through said hole and having a hooked lower end, as and for the purpose hereinbefore set forth.

In testimony that I claim the foregoing as my own I have hereto affixed my signature in the presence of two witnesses.

DEXTER COLE.

Witnesses.
 FRED. G. STEWART,
 CHAS. R. DENNISON.